US012356058B2

(12) United States Patent
Hegels et al.

(10) Patent No.: US 12,356,058 B2
(45) Date of Patent: Jul. 8, 2025

(54) CAMERA FOR A PORTABLE ELECTRONIC DEVICE WITH OPTICAL IMAGE STABILIZATION

(71) Applicant: Huawei Technologies Co., Ltd., Guangdong (CN)

(72) Inventors: Ernst Hegels, Munich (DE); Andreas Brueckner, Munich (DE); Volker Gaebler, Munich (DE); Zhenkai Qin, Dongguan (CN); Kai Chen, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 163 days.

(21) Appl. No.: 18/152,614

(22) Filed: Jan. 10, 2023

(65) Prior Publication Data

US 2023/0164415 A1    May 25, 2023

Related U.S. Application Data

(63) Continuation of application No. PCT/CN2020/102736, filed on Jul. 17, 2020.

(51) Int. Cl.
*H04N 23/55*    (2023.01)
*G02B 13/00*    (2006.01)
*G02B 15/14*    (2006.01)

(52) U.S. Cl.
CPC .......... *H04N 23/55* (2023.01); *G02B 13/006* (2013.01); *G02B 15/142* (2019.08)

(58) Field of Classification Search
CPC .. H04N 23/68; H04N 23/685; H04N 23/6812; G02B 27/646; G02B 27/642
See application file for complete search history.

(56) References Cited

U.S. PATENT DOCUMENTS 4,984,892 A * 1/1991 Hofmann ............... G02B 26/10
359/201.1
5,204,774 A * 4/1993 Owen, Jr. ............... G02B 23/18
359/744

(Continued)

FOREIGN PATENT DOCUMENTS

CN    101401023 A    4/2009
CN    102540627 A    7/2012

(Continued)

*Primary Examiner* — Chiawei Chen
(74) *Attorney, Agent, or Firm* — WOMBLE BOND DICKINSON (US) LLP

(57) ABSTRACT

A camera for a portable electronic device is provided. The camera comprises a housing, a first lens assembly (101) having a first optical axis, a second lens assembly (105, 107) having a second optical axis, a mirror (103) placed at a point of intersection of the first and the second optical axis, and an image sensor (109) placed on the second optical axis. Furthermore, the camera comprises an image stabilisation apparatus, comprising a first detector configured to generate a first signal in response to a rotation of the camera about an axis that is perpendicular to both the first and the second optical axis and a first actuator configured to rotate the first lens assembly (101) and the mirror (103) in response to the first signal relative to the housing about a first rotation axis perpendicular to the first and second optical axis for compensating the rotation of the camera.

20 Claims, 13 Drawing Sheets

(56) References Cited

U.S. PATENT DOCUMENTS

| | | | | | |
|---|---|---|---|---|---|
| 5,365,288 | A | * | 11/1994 | Dewald | G02B 26/0816 348/E9.026 |
| 6,455,830 | B1 | * | 9/2002 | Whalen | G02B 23/06 250/236 |
| 6,654,063 | B1 | * | 11/2003 | Tadatsu | G02B 27/642 348/36 |
| 9,049,374 | B2 | | 6/2015 | Ueda | |
| 10,101,677 | B2 | * | 10/2018 | Feijen | G03F 9/7069 |
| 11,531,209 | B2 | * | 12/2022 | Goldenberg | G02B 13/0065 |
| 11,579,463 | B2 | * | 2/2023 | Jeong | G02B 27/64 |
| 2006/0067672 | A1 | * | 3/2006 | Washisu | G02B 15/145 396/351 |
| 2006/0268431 | A1 | * | 11/2006 | Jin | G02B 27/646 359/726 |
| 2015/0212337 | A1 | * | 7/2015 | Nomura | G02B 13/0065 348/208.11 |
| 2015/0215541 | A1 | * | 7/2015 | Nomura | H04N 23/55 348/208.11 |
| 2015/0215542 | A1 | * | 7/2015 | Nomura | H04N 23/55 348/208.11 |
| 2019/0361224 | A1 | * | 11/2019 | Cho | G02B 26/0816 |
| 2019/0361225 | A1 | * | 11/2019 | Cho | G02B 7/1805 |
| 2020/0292816 | A1 | * | 9/2020 | Liu | G02B 27/0172 |
| 2021/0041075 | A1 | * | 2/2021 | Niu | F21S 41/153 |
| 2021/0080690 | A1 | * | 3/2021 | Lee | H02K 41/0356 |
| 2021/0208487 | A1 | * | 7/2021 | Cho | G03B 17/17 |

FOREIGN PATENT DOCUMENTS

| | | |
|---|---|---|
| CN | 108603752 A | 9/2018 |
| JP | H03132174 A | 6/1991 |
| JP | 2001509276 A | 7/2001 |
| JP | 2007108705 A | 4/2007 |
| JP | 2007201534 A | 8/2007 |
| JP | 2008116836 A | 5/2008 |
| JP | 2009294302 A | 12/2009 |
| JP | 2010204341 A | 9/2010 |
| JP | 2012118336 A | 6/2012 |
| JP | 2016114615 A | 6/2016 |
| JP | 2018036366 A | 3/2018 |
| JP | 2021521939 A | 8/2021 |
| WO | 2019210322 A1 | 10/2019 |
| WO | 2019222029 A1 | 11/2019 |

* cited by examiner

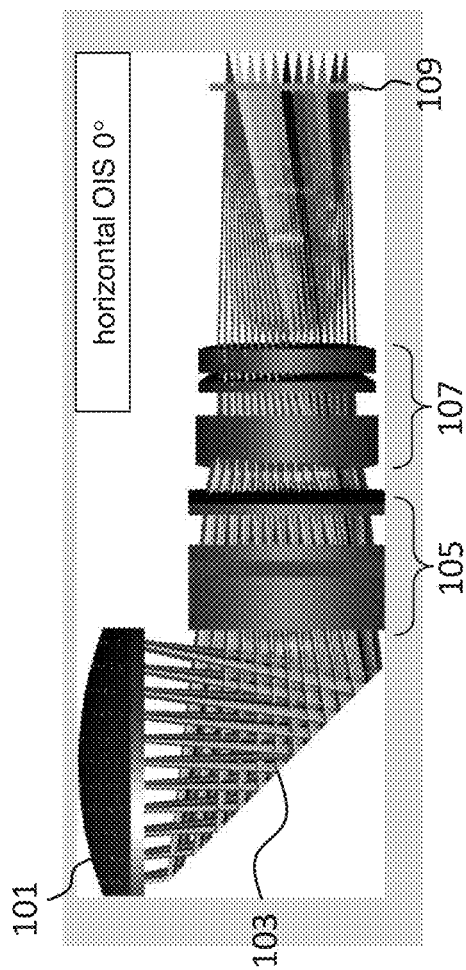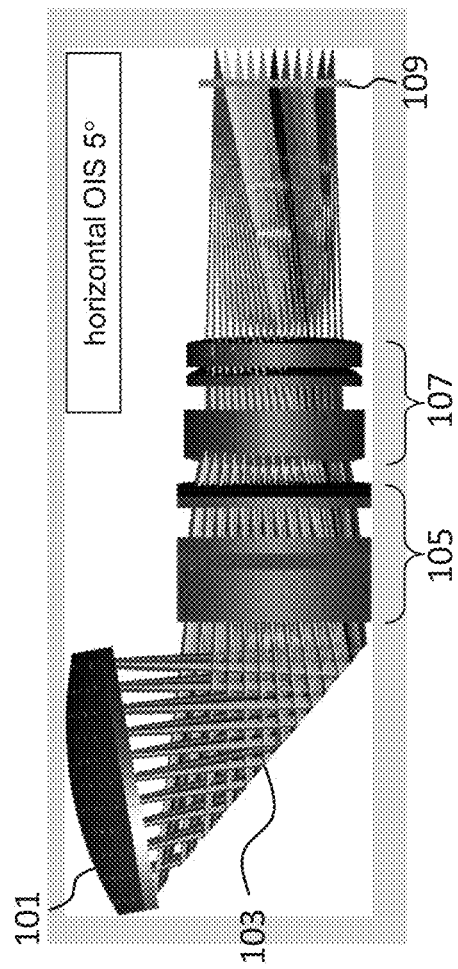

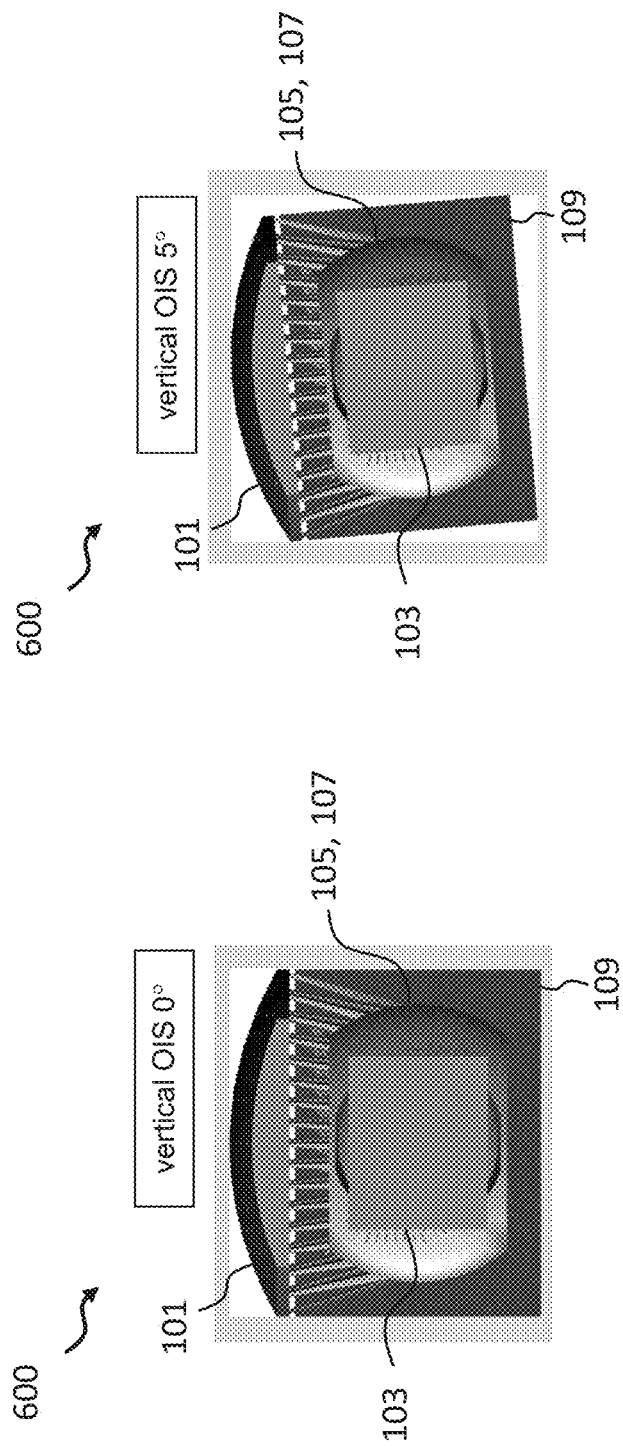

| Surf | Type | Radius | Thickness | Glass n/v | Clear Diam | 4th order | 6th order | 8th order | 10th order | 12th order | 14th order | 16th order |
|---|---|---|---|---|---|---|---|---|---|---|---|---|
| OBJ | STANDARD | Infinity | Infinity | | | | | | | | | |
| STO | EVENASPH | 9.703 | 1.293 | 1.50 / 81.6 | 10.48 | -1.11E-05 | -9.40E-07 | 2.59E-08 | -2.64E-10 | 1.30E-12 | -7.25E-13 | -9.46E-15 |
| 2 | EVENASPH | -60.551 | 0.428 | 1.45 / 61.9 | 10.55 | 1.13E-03 | -2.41E-05 | 1.03E-06 | -1.22E-08 | -3.19E-10 | -1.58E-13 | -7.05E-14 |
| 3 | STANDARD | Infinity | 3.700 | | | | | | | | | |
| 4 | COORDBRK | | | | | | 45 | | | | | |
| 5 | STANDARD | Infinity | -3.450 | MIRROR | | | | | | | | |
| 6 | COORDBRK | | | | | | 45 | | | | | |
| 7 | STANDARD | Infinity | -0.278 | 1.67 / 19.2 | 8.57 | | | | | | | |
| 8 | EVENASPH | -9.748 | -0.165 | | 8.33 | -1.24E-03 | -1.91E-05 | -1.22E-06 | 4.36E-07 | -2.51E-08 | 9.00E-10 | -1.27E-11 |
| 9 | EVENASPH | -9.595 | -1.789 | 1.54 / 56.0 | 8.54 | -1.75E-03 | -2.46E-05 | -2.44E-06 | 1.10E-07 | 4.75E-08 | -5.00E-09 | 1.52E-10 |
| 10 | EVENASPH | 19.317 | -0.704 | | 8.52 | -1.79E-03 | 7.29E-06 | -8.37E-08 | 5.97E-08 | -4.40E-08 | 3.84E-09 | -7.97E-11 |
| 11 | EVENASPH | -34.546 | -0.832 | 1.66 / 20.4 | 8.29 | -3.79E-04 | 5.22E-06 | 1.01E-05 | -2.41E-06 | 1.40E-07 | 2.91E-09 | -2.36E-10 |
| 12 | EVENASPH | 37.514 | -0.353 | | 8.36 | 7.77E-04 | 2.54E-05 | -8.41E-06 | -3.00E-07 | 8.08E-08 | -1.14E-09 | -5.20E-11 |
| 13 | EVENASPH | 681.159 | -0.416 | 1.57 / 37.4 | 6.22 | -8.61E-03 | 4.89E-04 | -1.78E-05 | 9.63E-06 | -3.53E-06 | 3.97E-07 | -1.46E-08 |
| 14 | EVENASPH | -5.338 | -1.936 | | 5.24 | -7.22E-03 | -4.77E-04 | 1.20E-04 | -8.53E-06 | -2.19E-06 | -1.31E-07 | 1.37E-08 |
| 15 | EVENASPH | -12.918 | -0.547 | 1.66 / 20.4 | 5.33 | 1.77E-02 | -1.14E-03 | 4.42E-04 | -7.79E-05 | 9.57E-06 | -1.45E-06 | 1.34E-07 |
| 16 | EVENASPH | 28.185 | -0.196 | | 5.33 | 2.08E-02 | -2.33E-03 | 4.57E-04 | -4.25E-05 | 7.39E-07 | -2.09E-07 | 4.81E-08 |
| 17 | EVENASPH | 6.965 | -0.298 | 1.54 / 56.0 | 5.78 | 3.31E-03 | 2.49E-04 | -1.06E-04 | 5.50E-05 | -8.55E-06 | -4.71E-09 | 4.50E-08 |
| 18 | EVENASPH | 66.423 | -6.576 | | 6.09 | -7.60E-04 | 1.60E-03 | -1.40E-04 | 1.58E-05 | -1.82E-06 | -6.10E-08 | 1.49E-08 |
| 19 | STANDARD | Infinity | -0.210 | 1.52 / 64.2 | 5.30 | | | | | | | |
| 20 | STANDARD | Infinity | -0.790 | | 5.28 | | | | | | | |
| IMA | STANDARD | Infinity | | | | | | | | | | |

Fig. 9

CAMERA FOR A PORTABLE ELECTRONIC DEVICE WITH OPTICAL IMAGE STABILIZATION

CROSS-REFERENCE TO RELATED APPLICATIONS

This application is a continuation of International Application No. PCT/CN2020/102736, filed on Jul. 17, 2020, the subject matter of which is hereby incorporated by reference in its entirety.

TECHNICAL FIELD

The present disclosure relates to optical imaging devices in general. More specifically, the disclosure relates to a camera and an electronic device with such a camera for capturing an image, such as a smartphone, tablet computer and the like with improved optical image stabilization.

BACKGROUND

Portable electronic devices such as smartphones or tablet computers may include a camera for recording digital images. The digital images may include still images (photos) as well as motion pictures (video). The camera may comprise folded optics. These can have a relatively long focal length (e.g., for portrait or telephotography). More specifically, the camera may comprise a first lens group, a mirror and second lens group, the two lens groups having optical axes that are angled relative to each other, e.g., by a 90 degrees angle.

A problem exists in that camera shake can lower the resolution of the resulting images, especially when the camera optics have a longer focal length. Camera shake is unintended motion of the camera, e.g., when the camera is operated hand-held.

A simple but often unfeasible way of avoiding camera shake is to mount the camera on a tripod. Another solution is a class of techniques known as image stabilisation (IS).

There is a need for reducing shake effects in images generated by folded optics, e.g., in smartphones.

SUMMARY

It is an object to provide image stabilization for folded optics, especially for folded optics in a photographic camera, and more particularly for a camera in a smartphone, tablet computer or other portable device.

The foregoing and other objects are achieved by the subject matter of the independent claims. Further implementation forms are apparent from the dependent claims, the description and the figures.

Generally, embodiments provide a new optical image stabilization (OIS) scheme that enables stable performance of telephoto lenses of a tele camera in an electronic handheld device without tripod mounting or the necessity of large image sensors. Embodiments overcome the stability limits of a tele camera in an electronic handheld device and solve the problem of high-angle image stabilization of digital telephoto camera zoom lenses with high magnification that are suitable to be implemented in a modern smartphone.

More specifically, according to a first aspect a camera is provided. The camera comprises a housing, a first lens assembly comprising one or more lenses and having a first optical axis and a second lens assembly comprising one or more lenses and having a second optical axis. As used herein, a lens assembly may comprise one or more lens groups. A lens group comprises one or more lenses that are fixed relative to each other, e.g., a lens group can be moved only as a whole.

Moreover, the camera comprises a mirror placed at a point of intersection of the first optical axis and the second optical axis and an image sensor placed on the second optical axis. The first lens assembly is configured to receive light from outside the camera and to transmit the received light toward the mirror. The mirror is configured to receive light from the first lens assembly and to reflect the received light toward the second lens assembly. The second lens assembly is configured to receive light from the mirror and to transmit the received light toward the image sensor.

The camera further comprises an image stabilisation, IS, apparatus, wherein the IS apparatus comprises a first detector configured to generate a first signal in response to a rotation of the camera about an axis that is perpendicular to both the first optical axis and the second optical axis. Moreover, the IS apparatus comprises a first actuator configured to rotate the first lens assembly relative to the housing about a first rotation axis by a an angle $\alpha$ in response to the first signal and at the same time rotate the mirror about the first rotation axis by an angle $\alpha/2$, wherein the first rotation axis is perpendicular to both the first optical axis and the second optical axis and passes through the point of intersection of the first optical axis and the second optical axis. Thus, advantageously, the first actuator allows reducing the effects of a shaking motion of the camera housing by adjusting the angle, e.g., the "pitch angle" between the first optical axis and the second optical axis.

In one embodiment, the IS apparatus further comprises a second detector configured to generate a second signal in response to a rotation of the camera about an axis identical with or parallel to the second optical axis and a second actuator configured to rotate a rotatable group of components relative to the housing about the second optical axis, wherein the rotatable group of components includes the first lens assembly, the mirror, and the second lens assembly. Thus, advantageously, the second actuator allows reducing the effects of a shaking motion of the camera housing by adjusting a "yaw angle" of the rotatable group of components relative to the camera housing.

In one embodiment, the rotatable group of components further includes the image sensor.

In one embodiment, the image sensor is fixed relative to the housing. Thus, in embodiment, the second actuator is configured to rotate the rotatable group of components relative to the camera housing and the image sensor.

In one embodiment, the IS apparatus further comprises a third detector configured to generate a third signal in response to a rotation of the camera about an axis that is perpendicular to both the first rotation axis and the second optical axis and a third actuator configured to rotate the image sensor relative to the housing about the second optical axis. Thus, advantageously, the third actuator allows reducing the effects of a shaking motion of the camera housing by adjusting a "roll angle" of the image sensor relative to the camera housing.

In one embodiment, the first lens assembly comprises a cemented achromatic lens comprising at least two different optical materials out of the choice of: glass, thermal plastics, UV-curable polymer, or Sol-Gel.

In one embodiment, the one or more lenses of the first lens assembly are fixed relative to each other.

In one embodiment the second lens assembly comprises a first lens group and a second lens group, wherein the first and the second lens group each comprise one or more lenses.

In one embodiment, one or both of the first and the second lens group have a positive refractive power.

In one embodiment, the first lens group has a positive refractive power and the second lens group has a negative refractive power, or vice versa.

In one embodiment, the camera further comprises focusing means for adjusting an axial position of the second lens group relative to the image sensor. As already described above, the lenses of the second lens group are immobile, i.e. fixed relative to each other.

In one embodiment, the IS apparatus is connected to the image sensor and is configured to perform IS based on object tracking.

According to a second aspect a portable electronic device is provided, wherein the portable electronic device comprises a camera according to the first aspect. The portable electronic device according to the second aspect may be, for instance, a smartphone, a tablet computer or other portable electronic device such as a drone, an augmented reality (AR) headset or a virtual reality (VR) headset.

Thus, embodiments provide an enhanced optical image stabilization (OIS) that is able to reach a correction angle up to 5 degree or even more. This value is comparable with a full field of view of 10 degrees in a tele camera.

Embodiments achieve high correction angles via this enhanced optical image stabilization (OIS), while totally holding the same image quality compared to the zero-angle imaging without any performance reduction.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments are described in more detail with reference to the attached figures and drawings, in which:

FIGS. 7A and 7B are diagrams illustrating an imaging lens system of a camera according to an embodiment with a pitch angle adjustment for optical image stabilization;

FIGS. 8A and 8B are diagrams illustrating an imaging lens system of a camera according to an embodiment with a roll angle adjustment for optical image stabilization; and FIG. 9 shows a table listing exemplary aspherical lens parameters of an imaging lens system of a camera according to an embodiment.

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Figure 1:
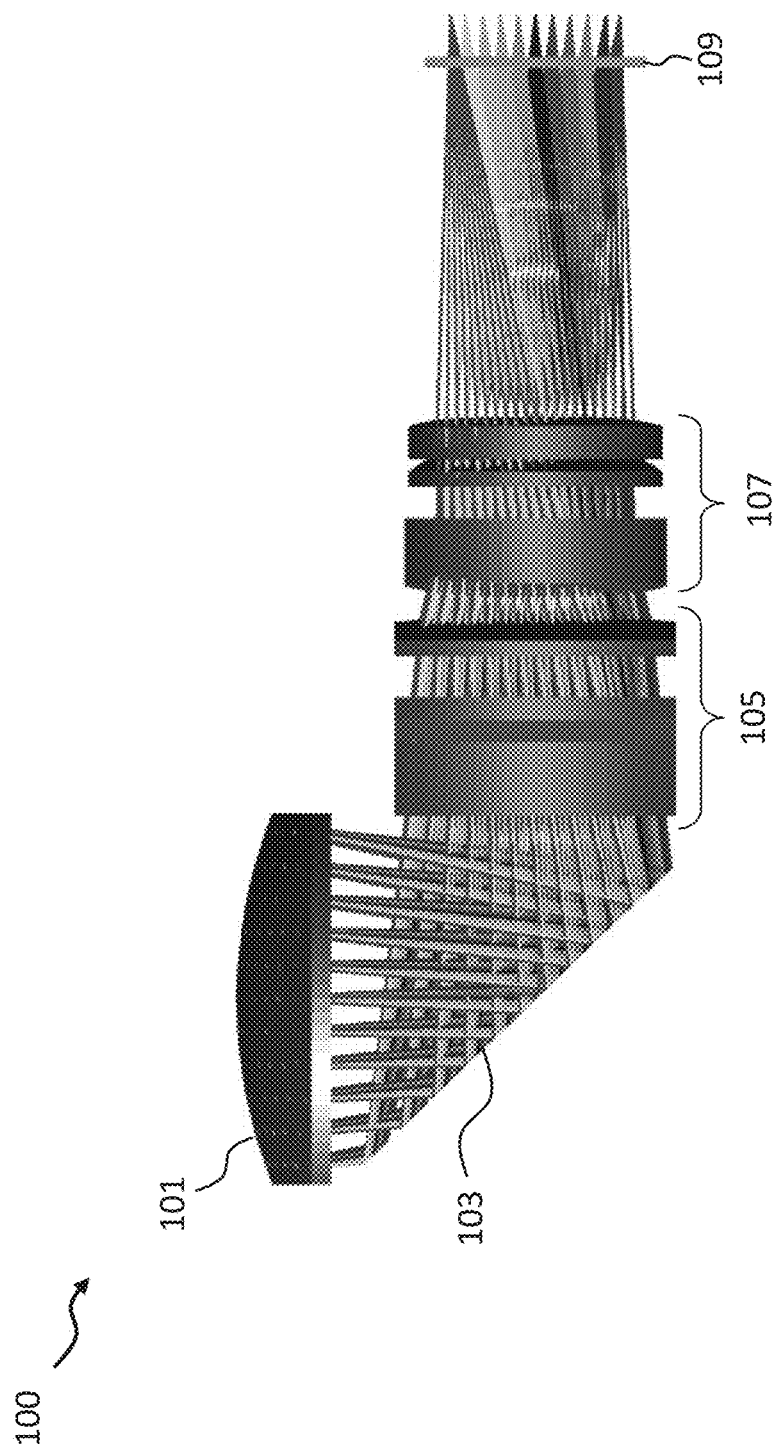
FIG. 1 is diagram illustrating an imaging lens system of a camera according to an embodiment.

FIG. 1 is a diagram illustrating the architecture of an imaging lens system 100 of a camera for an electronic device such as a smartphone, a tablet computer, any other portable electronic device or the like according to an embodiment. As will be described in more detail below, the camera comprises a housing, a first lens assembly 101 comprising one or more lenses and having a first optical axis A (illustrated, for instance, in FIGS. 2A-C) and a second lens assembly 105, 107 comprising one or more lenses and having a second optical axis B (illustrated, for instance, in FIGS. 2A-C). As used herein, a lens assembly may comprise one or more lens groups, wherein a lens group comprises one or more lenses that are fixed relative to each other, e.g., a lens group can be moved only as a whole. For instance, in the embodiment shown in FIG. 1, the second lens assembly 105, 107 comprises a first lens group 105 and a second lens group 107, wherein each of the first lens group 105 and the second lens group 107 comprises one or more lenses.

Moreover, the camera comprises a mirror 103 placed at a point of intersection of the first optical axis A and the second optical axis B and an image sensor 109 placed on the second optical axis B. The first lens assembly 101 is configured to receive light from outside the camera and to transmit the received light toward the mirror 103. The mirror 103 is configured to receive light from the first lens assembly 101 and to reflect the received light toward the second lens assembly 105, 107. The second lens assembly 105, 107 is configured to receive light from the mirror 103 and to transmit the received light toward the image sensor 109. As will be appreciated, for instance, from FIGS. 2A-C, the first lens assembly 101 defining the first optical axis A and the second lens assembly 105, 107 defining the second optical axis B are arranged in a folded configuration.

The camera further comprises an image stabilisation, IS, apparatus, wherein the IS apparatus comprises a first detector configured to generate a first signal in response to a rotation of the camera about an axis that is perpendicular to both the first optical axis A and the second optical axis B. In an embodiment, the first detector may comprise, for instance, a gyro sensor and/or an acceleration sensor.

Moreover, the IS apparatus comprises a first actuator configured to rotate the first lens assembly 101 relative to the housing about a first rotation axis by a an angle $\alpha$ in response to the first signal and at the same time rotate the mirror 103 about the first rotation axis by an angle $\alpha/2$, wherein the first rotation axis is perpendicular to both the first optical axis A and the second optical axis B and passes through the point of intersection of the first optical axis A and the second optical axis B. Thus, advantageously, the first actuator allows reducing the effects of a shaking motion of the camera housing by adjusting the angle, e.g., the "pitch angle" between the first optical axis A and the second optical axis B.

In an embodiment, the first lens assembly 101 comprises a hybrid glass/plastic bump lens. In another embodiment, the first lens assembly 101 comprises a cemented achromatic lens comprising, i.e. made of at least two different optical materials out of the choice of: glass, thermal plastics, UV-curable polymer, or Sol-Gel.

In an embodiment, the first lens assembly 101 has a positive refractive power, the first lens group 105 of the second lens assembly has a negative refractive power and the second lens group 107 of the second lens assembly has a positive refractive power. In another embodiment, the first lens assembly 101 has a positive refractive power, the first lens group 105 of the second lens assembly has a positive refractive power and the second lens group 107 of the second lens assembly has a negative refractive power. In a further embodiment, the first lens assembly 101 has a positive refractive power, the first lens group 105 of the second lens assembly has a positive refractive power and the second lens group 107 of the second lens assembly has a positive refractive power.

Figure 2A:
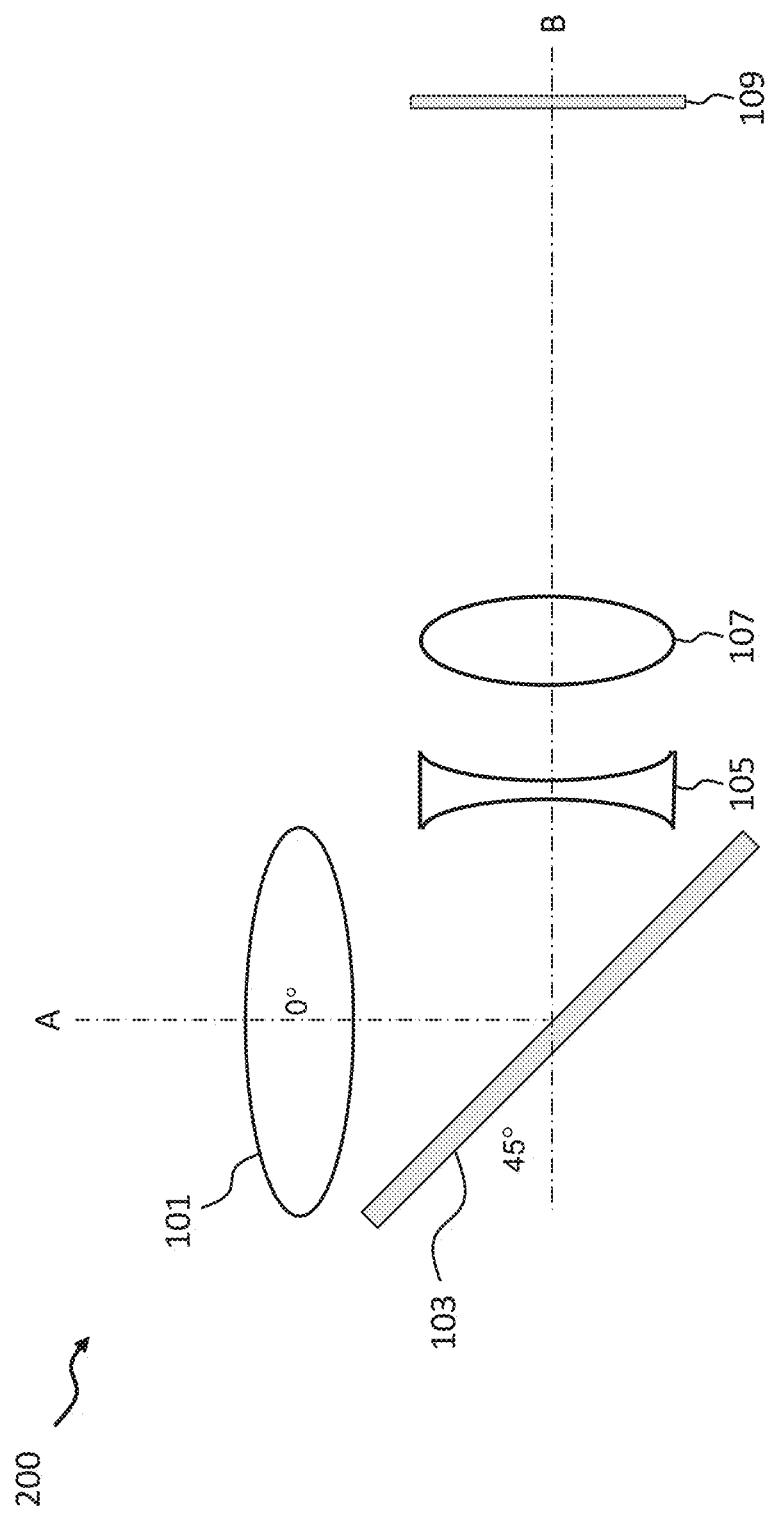
FIG. 2A is a diagram illustrating an imaging lens system of a camera according to an embodiment with horizontal angle adjustment for optical image stabilization.
Figure 2B:
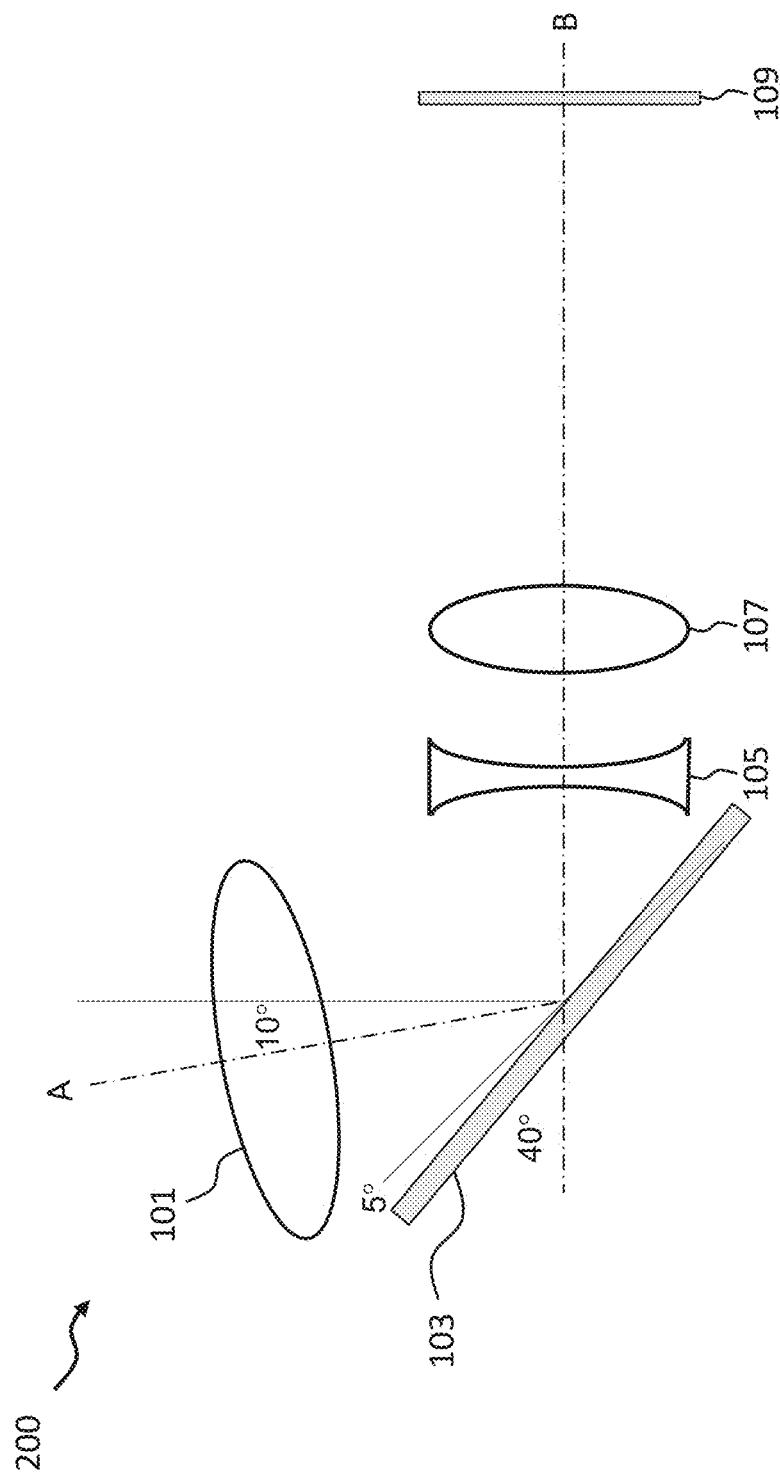
FIG. 2B is a diagram illustrating an imaging lens system of a camera according to an embodiment with horizontal angle adjustment for optical image stabilization.
Figure 2C:
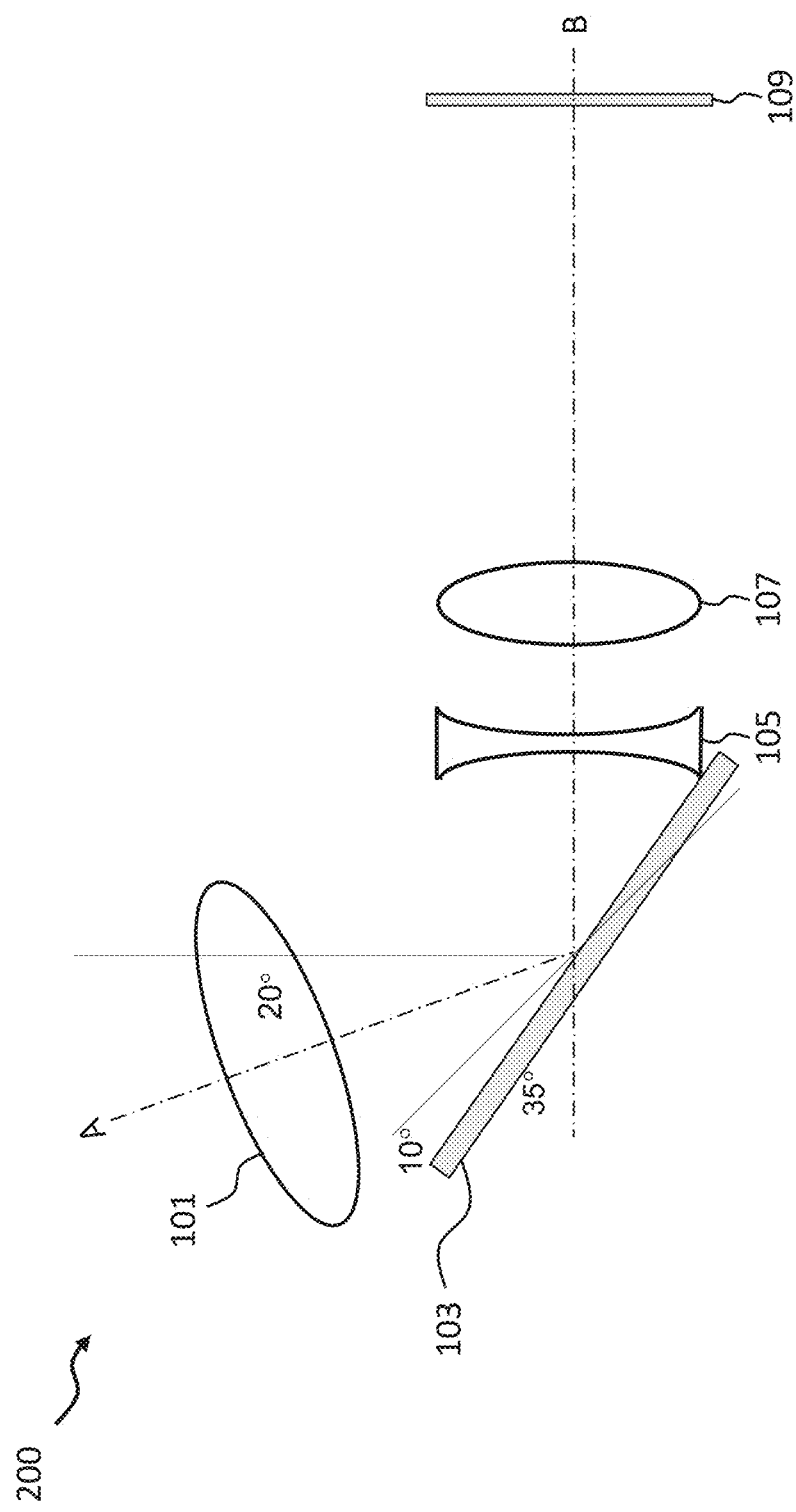
FIG. 2C is a diagram illustrating an imaging lens system of a camera according to an embodiment with horizontal angle adjustment for optical image stabilization.

As can be seen in FIGS. 2A, 2B and 2C below, the first optical axis (along which the first lens assembly 101 receives light; illustrated as first optical axis "A" in FIGS. 2A, 2B and 2C) and the second optical axis (defined by the second lens assembly 105, 107; illustrated as second optical axis "B" in FIGS. 2A, 2B and 2C) define an optical plane and intersect at an angle at an intersection point within the optical plane. As already described above, the mirror 103 is configured to transform, e.g. reflect, light propagating along the first optical axis A into light propagating along the second optical axis B. The image sensor 109 is configured detect light propagating along the second optical axis B.

As already described above, the first actuator of the IS apparatus is configured to rotate the first lens assembly 101 relative to the second lens assembly 105, 107 around a first rotation axis for adjusting the angle, i.e. the "pitch angle" between the first optical axis A and the second optical axis B, wherein the first rotation axis extends perpendicularly to the optical plane through the intersection point (i.e. perpendicular to the cross-sectional planes shown in FIGS. 2A, 2B and 2C).

In an embodiment, the IS apparatus may further comprise a second detector configured to generate a second signal in response to a rotation of the camera about an axis identical with or parallel to the second optical axis B. Like the first detector, the second detector may comprise, for instance, a gyro sensor and/or an acceleration sensor. In this embodiment, the IS apparatus further comprises second actuator configured to rotate a rotatable group of components relative to the housing of the camera about the second optical axis B, wherein the rotatable group of components includes the first lens assembly 101, the mirror 103, and the second lens assembly 105, 107. Thus, advantageously, the second actuator allows reducing the effects of a shaking motion of the camera housing by adjusting a "yaw angle" of the rotatable group of components, i.e. the first lens assembly 101, the mirror 103, and the second lens assembly 105, 107 as a whole, relative to the camera housing. In an embodiment, the rotatable group of components may further include the image sensor 109. In other words, in an embodiment, the second actuator is configured to rotate the first lens assembly 101, the mirror 103, the second lens assembly 105, 107 and the image sensor 109 as a whole relative to the camera housing.

In a further embodiment, the image sensor 109 may be fixed to the camera housing. Thus, in this embodiment the second actuator is configured to rotate the rotatable group of components, e.g., the first lens assembly 101, the mirror 103, and the second lens assembly 105, 107, relative to the camera housing and the image sensor 109.

In a further embodiment, the IS apparatus further comprises a third detector configured to generate a third signal in response to a rotation of the camera about an axis that is perpendicular to both the first rotation axis A and the second optical axis B. Like the first and the second detector, the third detector may comprise, for instance, a gyro sensor and/or an acceleration sensor. Moreover, the IS apparatus may comprise a third actuator configured to rotate the image sensor 109 relative to the camera housing about the second optical axis B. Thus, advantageously, the third actuator allows reducing the effects of a shaking motion of the camera housing by adjusting a "roll angle" of the image sensor 109 relative to the camera housing.

In an embodiment, the camera further comprises focusing means (such as a linear motor) for adjusting an axial position of the second lens group 107 relative to the image sensor 109. As already described above, the lenses of the second lens group 107 are immobile, i.e. fixed relative to each other.

In an embodiment, the IS apparatus is connected to the image sensor 109 and is configured to perform IS based on object tracking and to control the plurality of actuators based on the object tracking.

Embodiments of the disclosure apply a variable angle folding and rotating of a periscope-type optics, wherein the front lens/bump optics always points directly into the direction of the object. In an embodiment, the alignment of the front lens being part of the first lens assembly 101 is achieved by a combined angle and rolling adjustment of the camera optics that includes a certain angle adjustment of the bump optics and of the folding optics respectively.

To always directly point the front lens being part of the first lens assembly 101 to the object, the optical image stabilization (optical IS) according to an embodiment is split into two independent angle adjustments, namely the roll angle adjustment in a vertical direction and the pitch angle adjustment in a horizontal direction of the optical IS.

FIGS. 2A, 2B and 2C show an example of the pitch or horizontal angle adjustment with 0°, 10° and 20° for the optical image stabilization respectively. The horizontal adjustment of the optical IS consists of an adjustable periscope optics including a variable front lens angle combined with a variable folding optics angle in a way that the folding optics is adjusted at exactly half the angle of the front lens (or 2:1 if measured with the front lens angle respectively).

As already described above, an imaging lens system 200 is shown in FIGS. 2A, 2B and 2C, wherein the imaging lens system 200 comprises: a first lens assembly 101 configured to receive light via the aperture from outside of the housing along the first optical axis A; a second lens assembly 105, 107 defining the second optical axis B; a mirror 103 arranged between the first lens assembly 101 and the second lens assembly 105, 107; and an image sensor 109 arranged along the second optical axis B behind the second lens assembly 105, 107. As in the embodiment shown in FIG. 1, the second lens assembly 105, 107 comprise a first lens group 105 and a second lens group 107 arranged on the second optical axis B between the mirror 103 and the image sensor 109.

As can be seen from FIGS. 2A, 2B and 2C, by means of the first detector and the first actuator of the IS apparatus the first lens assembly 101 is configured to be rotated relative to the second lens assembly 105, 107 around the first rotation axis by a first rotation angle α and the reflecting mirror 103 is configured to be rotated around the first rotation axis by a second rotation angle β, wherein the first rotation angle α is twice as large as the second rotation angle β, i.e. α=2*β.

Figure 3A:
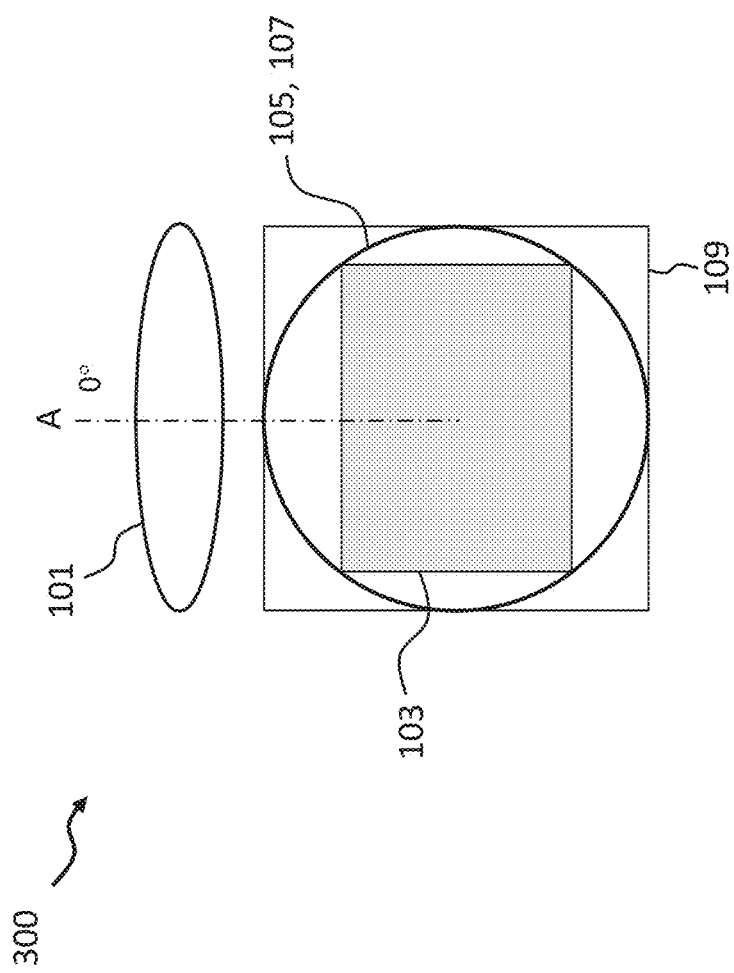
FIG. 3A is a diagram illustrating an imaging lens system of a camera according to an embodiment with vertical angle adjustment for optical image stabilization.
Figure 3B:
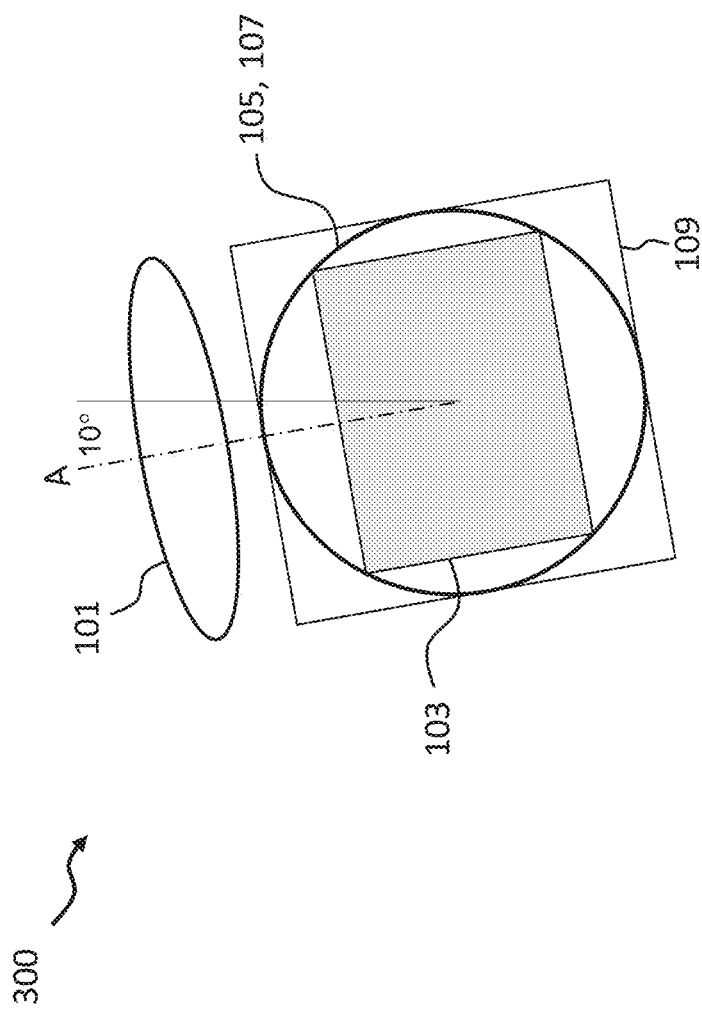
FIG. 3B is a diagram illustrating an imaging lens system of a camera according to an embodiment with vertical angle adjustment for optical image stabilization.
Figure 3C:
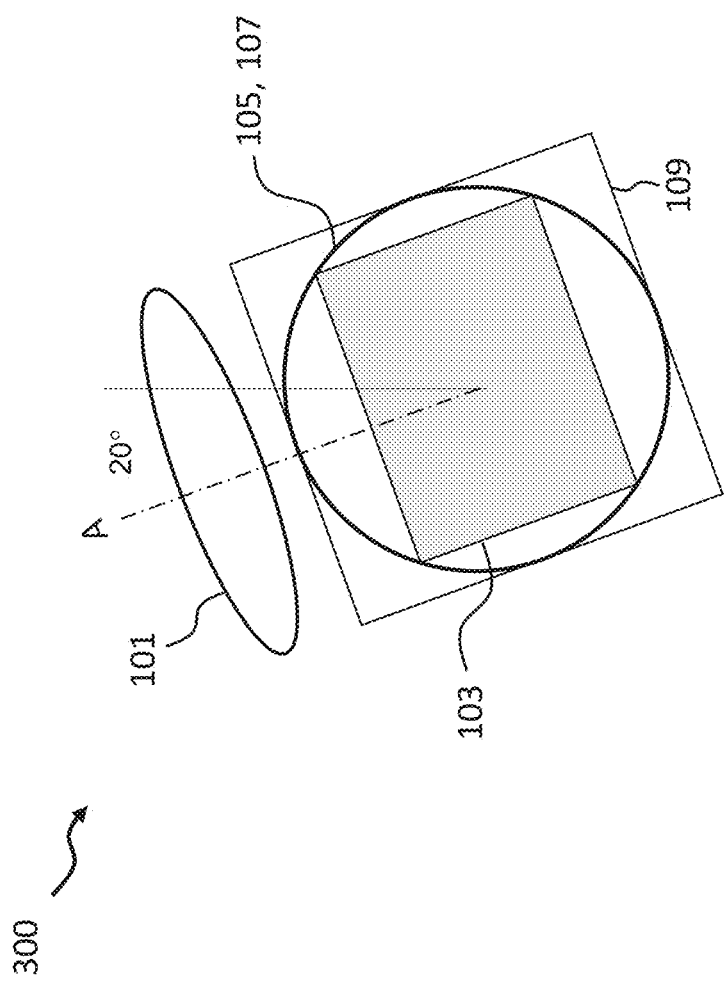
FIG. 3C is a diagram illustrating an imaging lens system of a camera according to an embodiment with vertical angle adjustment for optical image stabilization.

FIGS. 3A, 3B and 3C show an example of the roll or vertical angle adjustment with 0°, 10° and 20° for the optical image stabilization respectively effected by the second detector and the second actuator of the IS apparatus. The roll or vertical angle adjustment of the optical IS consists of a rotational orientation of the periscope optics group around the second optical axis B in a way that the resulting adjustment angle matches exactly the necessary angle for the optical IS.

In an embodiment, the combined function of the system rotation and the 2:1 angle matching of the front lens being part of the first lens assembly 101 and folding optics achieves an optical performance and image quality that is basically independent of the actual amount of the IS adjustment. Therefore, the maximum angle for the optical IS is only limited by the mechanical layout of the housing.

As can be seen from FIGS. 3A, 3B and 3C and as already described above, the first lens assembly 101, the mirror 103, and the second lens assembly 105, 107 are rotated as a whole around the second rotation axis B for adjusting the "roll angle" of the first lens assembly 101, the mirror 103, and the second lens assembly 105, 107 relative to the housing, wherein the second rotation axis B corresponds to the second optical axis B, i.e. wherein the second rotation axis B and the second optical axis B are the same.

In addition to the vertical and horizontal image stabilization by the above described optical IS provided by the IS apparatus, there is furthermore a possibility to additionally rotate the image sensor 109 around the second rotation axis B, as already described above. This also stabilizes the unintended image shaking due to any possible camera rotation that can happen beside the vertical and horizontal misalignment.

Embodiments of the disclosure can perfectly adjust to any possible device shaking that happens within a certain limit, e.g., 5°, which corresponds to the optomechanical layout of the device.

Figure 4:
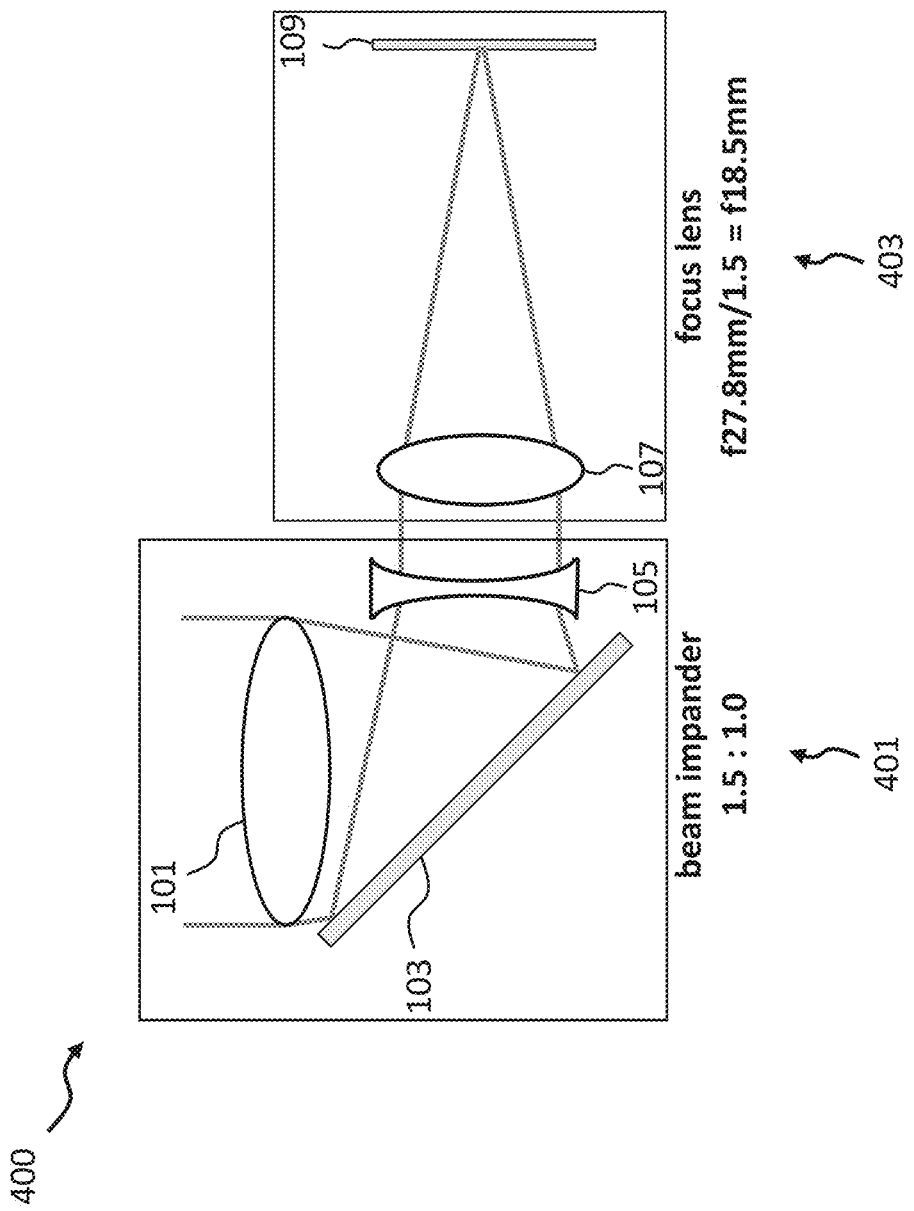
FIG. 4 is a diagram illustrating an imaging lens system of a camera according to an embodiment.

Furthermore, embodiments of the disclosure may implement a beam impander that concentrates the light into the folded periscope optics by the use of a front lens with a positive optical power. FIG. 4 illustrates a further embodiment of the camera including a beam impander provided by the first lens assembly 101, the mirror 103 and the first lens group 105 of the second lens assembly.

As shown in FIG. 4, the first lens assembly 101 has a positive refractive power, the first lens group 105 of the second lens assembly has a negative refractive power and the second lens group 107 of the second lens assembly has a positive refractive power.

This enables a lower F-Number and splits the imaging lens system 400 into a principle front part (e.g., the beam impander) 401 and a rear part 403, wherein the front part 401 includes the first lens assembly 101, the folding optics, i.e. the mirror 103 and the first lens group 105 of the second lens assembly after the folding and the rear part 403 includes the focusing optics group, i.e. the second lens group 107 of the second lens assembly that focuses the light onto the image sensor 109.

Figure 5:
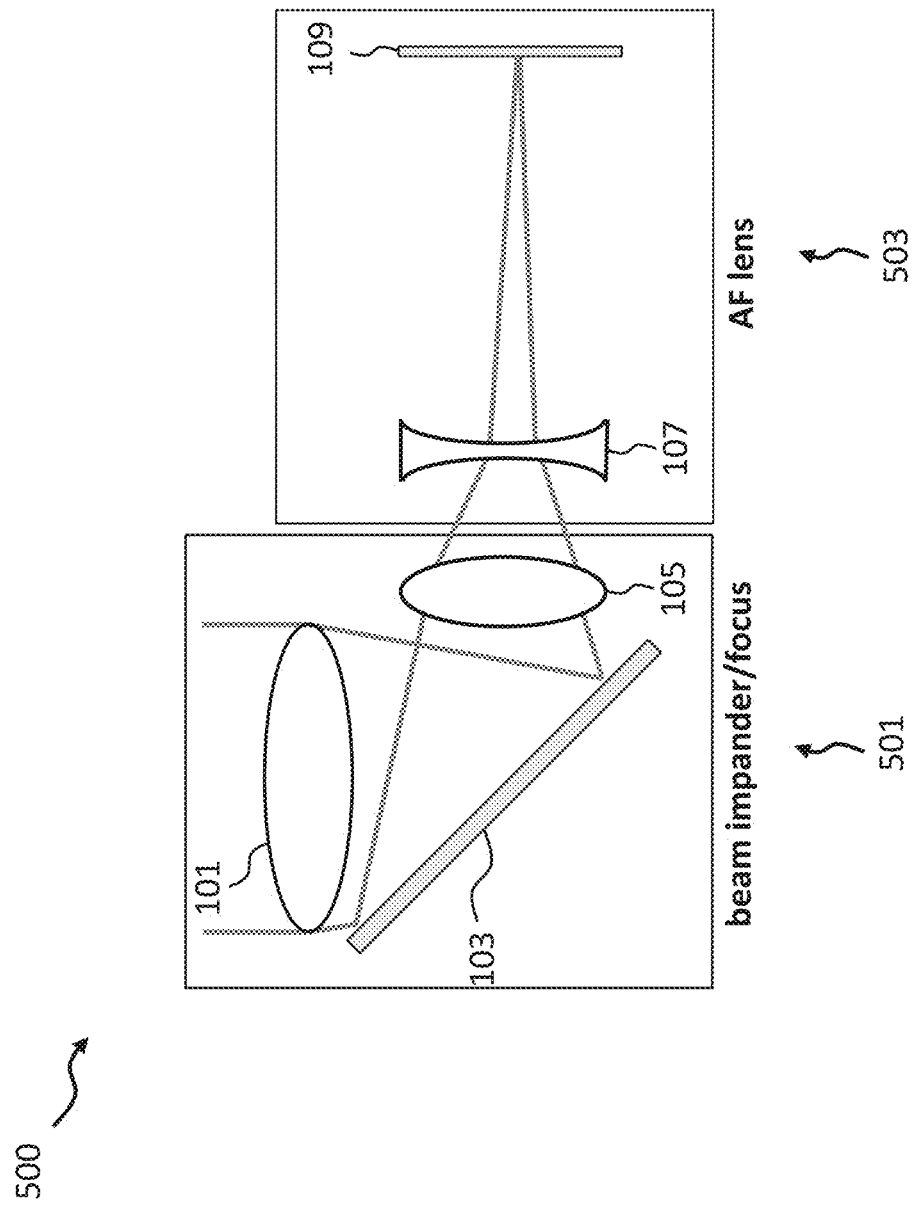
FIG. 5 is a diagram illustrating an imaging lens system of a camera according to an embodiment.

Alternatively, FIG. 5 shows another imaging lens system 500 of the camera according to an embodiment, wherein the focusing lens can also be implemented in the front optics part 501, which is followed by a lens with negative optical power, enabling auto focus (AF) within the system. As can be seen from FIG. 5, the first lens assembly 101 has a positive refractive power, the first lens group 105 of the second lens assembly has a positive refractive power and the second lens group 107 of the second lens assembly has a negative refractive power.

Figure 6:
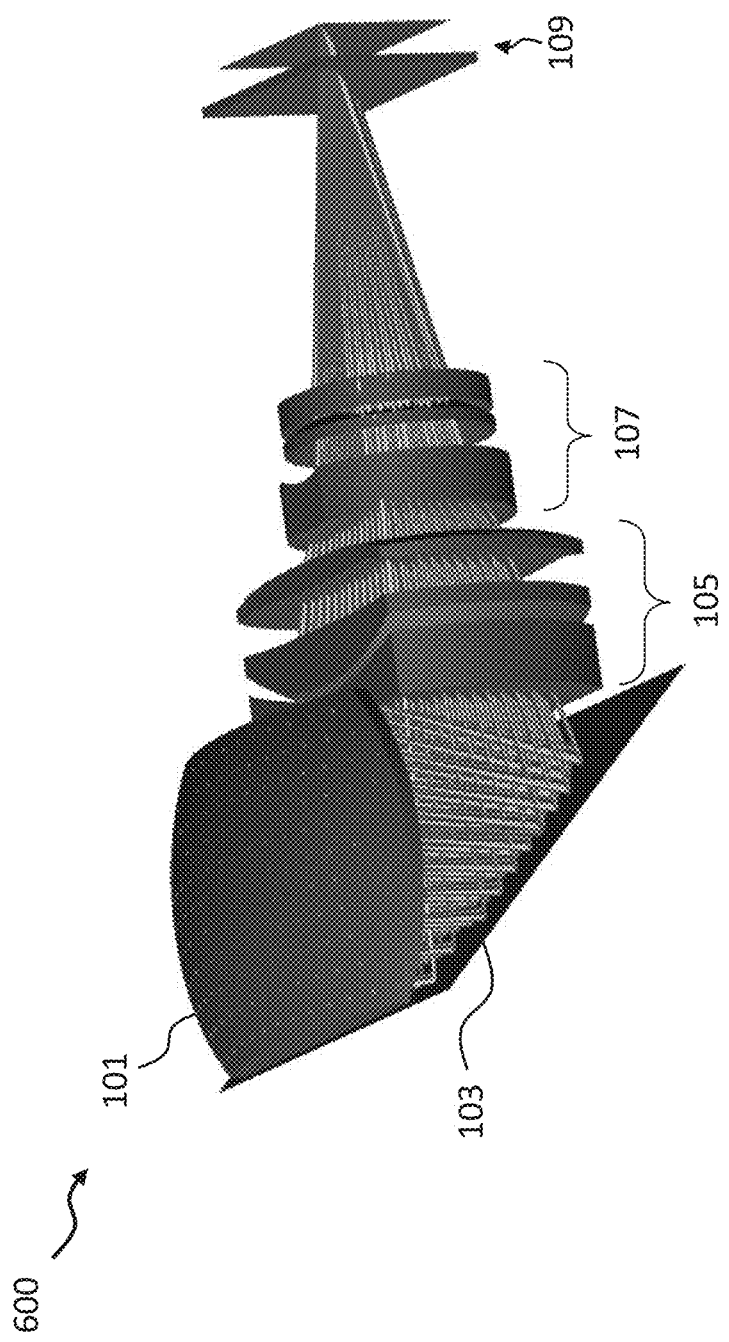
FIG. 6 is a diagram illustrating a three-dimensional view of an imaging lens system of a camera according to an embodiment.

FIG. 6 shows a three-dimensional perspective view of the imaging lens system 600 of the camera according to an embodiment with a magnification power of ten times (e.g., M10x) which is suitable to be implemented into a modern smartphone according to an embodiment, wherein the total system length is 22 mm and the camera module achieves a f-number of F2.96.

The imaging lens system 600 of the telephoto camera consists of the lens assemblies, e.g., groups 101, 105, 107, the folding mirror 103 and the image sensor 109. The light enters through the first optical lens assembly 101 which may comprise a hybrid glass/plastic lens. The first lens assembly 101 has positive optical refractive power and is located in front of the folding mirror 103. In an initial state the angle of the folding mirror 103 is 45° while the angle of the first lens assembly 101 is 90°. The first lens group 105 of the second lens assembly comprises three plastic lenses and is located directly behind the folding mirror 103. The first lens group 105 has also a positive optical refractive power. The second lens group 107 of the second lens assembly may also comprise three plastic lenses and is located in front of the image sensor 109. The second lens group 107 of the second lens assembly has a negative optical refractive power. The second optical lens group 107 of the second lens assembly can move along the second optical axis B to enable near imaging for the auto focus function of the camera.

As can be seen from FIG. 6, the cross sections of the lenses have been shaped in a special aperture cut, in order to fit the lenses into the mechanical high of the smartphone.

FIGS. 7A and 7B demonstrate the optical imaging system 600 of the telephoto camera shown in FIG. 6 with a pitch or horizontal angle adjustment of 5° within the camera body for the optical image stabilization in the same way as described above under reference to FIGS. 2A, 2B and 2C. As described above, by means of the first detector and the first actuator of the IS apparatus the positions of the first lens assembly 101 and of the first lens group 105 of the second lens assembly as well as of the folding mirror 103 are adjusted to compensate for horizontal image deviation.

FIGS. 8A and 8B further demonstrate the imaging lens system 600 of the telephoto camera shown in FIG. 6 with a roll or vertical angle adjustment of 5° within the camera body for the optical image stabilization in the same way as described above under reference to FIGS. 3A, 3B and 3C. As can be seen from FIGS. 8A and 8B, the imaging lens system 600 is rolled around the second optical axis B relative to the housing to compensate for vertical image shaking. In other words, the first lens assembly 101, the mirror 103, the second lens assembly 105, 107 and the image sensor 109 are rotated as a whole around the second rotation axis B. As already described above, in a further embodiment, the image sensor 109 may be fixed to the camera housing and thereby decoupled form this rolling motion of the first lens assembly 101, the mirror 103, and the second lens assembly 105, 107.

The above adjustments from all optical image stabilization (01S) components combined can achieve a complete and highly effective image stabilization over a range of +/−5° degree in both, vertical and horizontal, directions.

FIG. 9 shows a table 900 listing exemplary aspherical lens parameters of the imaging lens system 100 of FIG. 1 in a telephoto camera according to an embodiment in a standard sequential surface matrix, including for instance the surface type, the radius, the thickness, the refractive index/the Abbe number, the asphere coefficients of the different lens surfaces of the imaging lens system of FIG. 1.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units may be integrated into one unit.

The invention claimed is:

1. A camera comprising:
    a housing;
    a first lens assembly comprising one or more lenses and having a first optical axis, the first lens assembly being configured to receive light from outside the camera and to transmit the light toward a mirror;
    the mirror placed at a point of intersection of the first optical axis and a second optical axis and configured to receive the light from the first lens assembly and to reflect the light toward a second lens assembly;
    the second lens assembly comprising one or more lenses and having the second optical axis, the second lens assembly being configured to receive the light from the mirror and to transmit the light toward an image sensor;
    the image sensor placed on the second optical axis; and
    an image stabilisation (IS) apparatus comprising:
        a first detector configured to generate a first signal in response to a rotation of the camera about an axis perpendicular to both the first optical axis and the second optical axis;
        a first actuator configured to rotate the first lens assembly relative to the housing about a first rotation axis by a first angle in response to the first signal and at the same time rotate the mirror about the first rotation axis by a second angle which is half of the first angle, wherein the first rotation axis is perpendicular to both the first optical axis and the second optical axis and passes through the point of intersection of the first optical axis and the second optical axis;
        a second detector configured to generate a second signal in response to a rotation of the camera about an axis perpendicular to both the first rotation axis and the second optical axis; and
        a second actuator configured to rotate the image sensor relative to the housing about the second optical axis.

2. The camera of claim 1, wherein the IS apparatus further comprises:
    a third detector configured to generate a third signal in response to a rotation of the camera about an axis identical with or parallel to the second optical axis; and
    a third actuator configured to rotate a rotatable group of components relative to the housing about the second optical axis, the rotatable group of components including the first lens assembly, the mirror, and the second lens assembly.

3. The camera of claim 2, wherein the rotatable group of components further includes the image sensor.

4. The camera of claim 1, wherein the first lens assembly comprises a cemented achromatic lens comprising at least two different optical materials of: glass, thermal plastics, UV-curable polymer, or Sol-Gel.

5. The camera of claim 1, wherein the one or more lenses of the first lens assembly are fixed relative to each other.

6. The camera of claim 5, wherein the second lens assembly comprises a first lens group and a second lens group, each of the first and the second lens group each comprising one or more lenses.

7. The camera of claim 6, wherein at least one of the first lens group or the second lens group has a positive refractive power.

8. The camera of claim 6, wherein the first lens group has a positive refractive power and the second lens group has a negative refractive power, or vice versa.

9. The camera of claim 6, comprising focusing component for adjusting an axial position of the second lens group.

10. The camera of claim 1, wherein the IS apparatus is connected to the image sensor and configured to perform IS based on object tracking.

11. A portable electronic device comprising:
   a camera comprising:
      a housing;
      a first lens assembly comprising one or more lenses and having a first optical axis, the first lens assembly being configured to receive light from outside the camera and to transmit the light toward a mirror;
      the mirror placed at a point of intersection of the first optical axis and a second optical axis and configured to receive the light from the first lens assembly and to reflect the light toward a second lens assembly;
      the second lens assembly comprising one or more lenses and having the second optical axis, the second lens assembly being configured to receive the light from the mirror and to transmit the light toward an image sensor;
      the image sensor placed on the second optical axis; and
      an image stabilisation (IS) apparatus comprising:
         a first detector configured to generate a first signal in response to a rotation of the camera about an axis perpendicular to both the first optical axis and the second optical axis; and
         a first actuator configured to rotate the first lens assembly relative to the housing about a first rotation axis by a first angle in response to the first signal and at the same time rotate the mirror about the first rotation axis by a second angle which is half of the first angle, wherein the first rotation axis is perpendicular to both the first optical axis and the second optical axis and passes through the point of intersection of the first optical axis and the second optical axis;
         a second detector configured to generate a second signal in response to a rotation of the camera about an axis perpendicular to both the first rotation axis and the second optical axis; and
         a second actuator configured to rotate the image sensor relative to the housing about the second optical axis.

12. The portable electronic device of claim 11, wherein the portable electronic device is a smartphone or a tablet computer.

13. The portable electronic device of claim 11, wherein the IS apparatus further comprises:
   a third detector configured to generate a third signal in response to a rotation of the camera about an axis identical with or parallel to the second optical axis; and
   a third actuator configured to rotate a rotatable group of components relative to the housing about the second optical axis, the rotatable group of components including the first lens assembly, the mirror, and the second lens assembly.

14. The portable electronic device of claim 13, wherein the rotatable group of components further includes the image sensor.

15. The portable electronic device of claim 11, wherein the first lens assembly comprises a cemented achromatic lens comprising at least two different optical materials of: glass, thermal plastics, UV-curable polymer, or Sol-Gel.

16. The portable electronic device of claim 11, wherein the one or more lenses of the first lens assembly are fixed relative to each other.

17. The portable electronic device of claim 16, wherein the second lens assembly comprises a first lens group and a second lens group, each of the first and the second lens group each comprising one or more lenses.

18. The portable electronic device of claim 17, wherein at least one of the first lens group or the second lens group has a positive refractive power.

19. The portable electronic device of claim 17, wherein the first lens group has a positive refractive power and the second lens group has a negative refractive power, or vice versa.

20. The portable electronic device of claim 17, comprising focusing component for adjusting an axial position of the second lens group.

* * * * *